United States Patent
Zhang et al.

(10) Patent No.: US 6,381,542 B1
(45) Date of Patent: Apr. 30, 2002

(54) GENERIC, ACCURATE, AND REAL TIME BOREHOLE CORRECTION FOR RESISTIVITY TOOLS

(75) Inventors: Zhiyi Zhang; Alberto G. Mezzatesta, both of Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/543,727

(22) Filed: Apr. 5, 2000

(51) Int. Cl.$^7$ ................................................. G01V 3/18
(52) U.S. Cl. .............................................................. 702/7
(58) Field of Search ................................ 702/7, 6, 8, 10, 702/11, 12, 13; 324/338, 339; 703/6, 10; 706/929

(56) References Cited

U.S. PATENT DOCUMENTS

| | | | |
|---|---|---|---|
| 5,142,472 A | 8/1992 | Day | 364/422 |
| 5,446,654 A | 8/1995 | Chemali et al. | 364/422 |
| 5,862,513 A | 1/1999 | Mezzatesta et al. | 702/9 |
| 5,867,806 A | 2/1999 | Strickland et al. | 702/7 |
| 5,870,690 A | 2/1999 | Frenkel et al. | 702/7 |
| 5,900,733 A | 5/1999 | Wu et al. | 324/338 |
| 5,999,883 A | 12/1999 | Gupta et al. | 702/7 |
| 6,044,325 A | 3/2000 | Chakravarthy et al. | 702/7 |

*Primary Examiner*—Donald E. McElheny, Jr.
(74) *Attorney, Agent, or Firm*—Madan, Mossman & Sriram, P.C.

(57) ABSTRACT

A Neural Net (NN) is trained, validated and used for borehole correction of resistivity logging data. In the training stage, the entire range of possibilities of earth models relevant to borehole compensation is sampled and a suite of tool responses is generated, with and without the borehole and the NN is trained to produce the corresponding borehole-free response. In the validation stage, the input to the NN comprises tool responses that were not used in the training of the NN and validation is based upon comparing the output of the NN to the corresponding borehole-free response. If the agreement is not good, then the NN is retrained with a different sampling of the earth model. The validated NN is then used to correct the borehole measurements. The borehole corrected measurements may be inverted using an additional neural net designed for the purpose.

23 Claims, 4 Drawing Sheets

GENERIC, ACCURATE, AND REAL TIME BOREHOLE CORRECTION FOR RESISTIVITY TOOLS

FIELD OF THE INVENTION

The present invention relates to the processing of resistivity logs, and more particularly to a method of correcting the log measurements for borehole effects using a neural-net (NN) implementation. This makes it possible to obtain rapid correction for borehole effects prior to inversion of the resistivity data.

BACKGROUND OF THE INVENTION

A commonly used technique for evaluating formations surrounding an earth borehole is resistivity logging. Porous formations having high resistivity generally indicate the presence of hydrocarbons, while porous formations with low resistivity are generally water saturated. There are many prior art methods for the determination of the resistivity of subsurface earth formations using resistivity logging tools.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517, U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al, (the "Gupta patent"), the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

One problem with the inversion of electromagnetic data is that the region immediately surrounding the borehole can be invaded by borehole fluid or mud filtrate and have a different resistivity than the virgin formation. This turns what is a 1-D inversion into a 2-D inversion. To deal with this problem, it is common practice to use resistivity logging devices with multiple depths of investigation to provide information about the properties of the virgin formation, the invaded zone and the borehole.

In measurements made at low frequencies using induction logging instruments in a vertical borehole, the borehole effects add linearly to the tool response. For such a situation, the borehole correction may be simply applied by simply considering the response of a fluid-filled borehole in a homogenous formation. After applying the borehole correction, a straightforward inversion of the borehole-corrected data readily gives a layered model of the formations surrounding the borehole.

In measurements made with galvanic instruments, induction logging tools at nonzero frequencies or propagation resistivity tools at nonzero frequencies, the borehole effect is no longer additive. In these cases, the problem becomes nonlinear and the borehole corrections become a function of the properties of the formation in addition to the properties of the borehole. The fundamental reason for the nonlinearity in all of these situations is the accumulation of electrical charges at the interfaces between layers of the formation. Accordingly, this problem of nonlinearity also arises at low frequencies in induction logging of deviated boreholes wherein the axis of the borehole is not normal to the bedding planes in the formation and in induction logging using a transverse coil. In crossing the borehole wall, resulting in charge accumulation and the accompanying nonlinearity.

U.S. Pat. No. 5,900,733 to Wu et al. discloses a well logging method and apparatus for determining borehole corrected formation resistivity, borehole diameter, and downhole borehole fluid (mud) resistivity with improved accuracy. A logging device in the borehole transmits electromagnetic energy from a transmitter, which energy is received at receivers on the logging device. The phase and amplitude of the received energy are measured at the receivers and a phase shift, phase average, and attenuation are associated with the transmitter-to-receivers spacing. The process is then repeated for a plurality of further transmitters having different spacings from the receivers. A formation and borehole model having model values of borehole corrected formation resistivity, borehole diameter, and borehole fluid resistivity is obtained by inversion of the measured data. Values of borehole corrected formation resistivity, borehole diameter, and borehole fluid resistivity that would produce a model phase shift, phase average and attenuation corresponding to the measured values of these parameters are then determined.

U.S. Pat. No. 5,867,806 to Strickland et al discloses a method in which one or more control depths at one or more locations of each of a plurality of detected beds in the formation. The control depths are determined based on determined bed boundaries. The method then estimates the resistivity of each bed only at the selected control depths to produce an estimated resistivity of the beds. The method then computes a simulated log value at each control depth using a current estimate of the resistivity of the beds. The computed simulated log, is then compared to the actual log data at each control depth, and the resistivity of each bed is adjusted using the difference between the actual and simulated values at the control depths. The above method iteratively repeats a plurality of times until the simulated log substantially matches the actual log at the control depths.

The prior art methods for correction for borehole effects generally assume simple models for these borehole effects. Typically, the borehole effect is modeled using a single invaded zone and borehole axis is assumed to be normal to the bed boundaries. Even in such a simplified model, the compensation for borehole effects and shoulder bed effects is quite time consuming.

There is a need for a method of correcting resistivity logging data for the effects of fluid invasion and shoulder beds in complicated environments. Such a method should preferably be simple and preferably should be capable of real time implementation, so that resistivity measurements may be corrected for borehole effects prior to further processing. The present invention satisfies this need.

SUMMARY OF THE INVENTION

The present invention is a method for borehole correction of resistivity logging data. The method comprises two stages. In the first stage, the entire range of possibilities of earth models relevant to borehole compensation is sampled and a suite of tool responses is generated, with and without the borehole. A wide range tool responses including the borehole effects are input to a neural-net (NN) and the NN is trained to produce the corresponding borehole-free response. Once the NN has been trained ( in terms of a set of weighting coefficients), in the second stage, the NN is validated by using as input tool responses (including borehole effects) that were not used in the training of the NN and comparing the output of the NN to the corresponding borehole-free response. If the agreement is good, then the NN has been validated and may be used to process subsequently acquired data that includes borehole effects. If the agreement is not good, then the NN is retrained with a different sampling of the earth model.

DESCRIPTION OF THE PREFERRED EMBODIMENT

Figure 1:
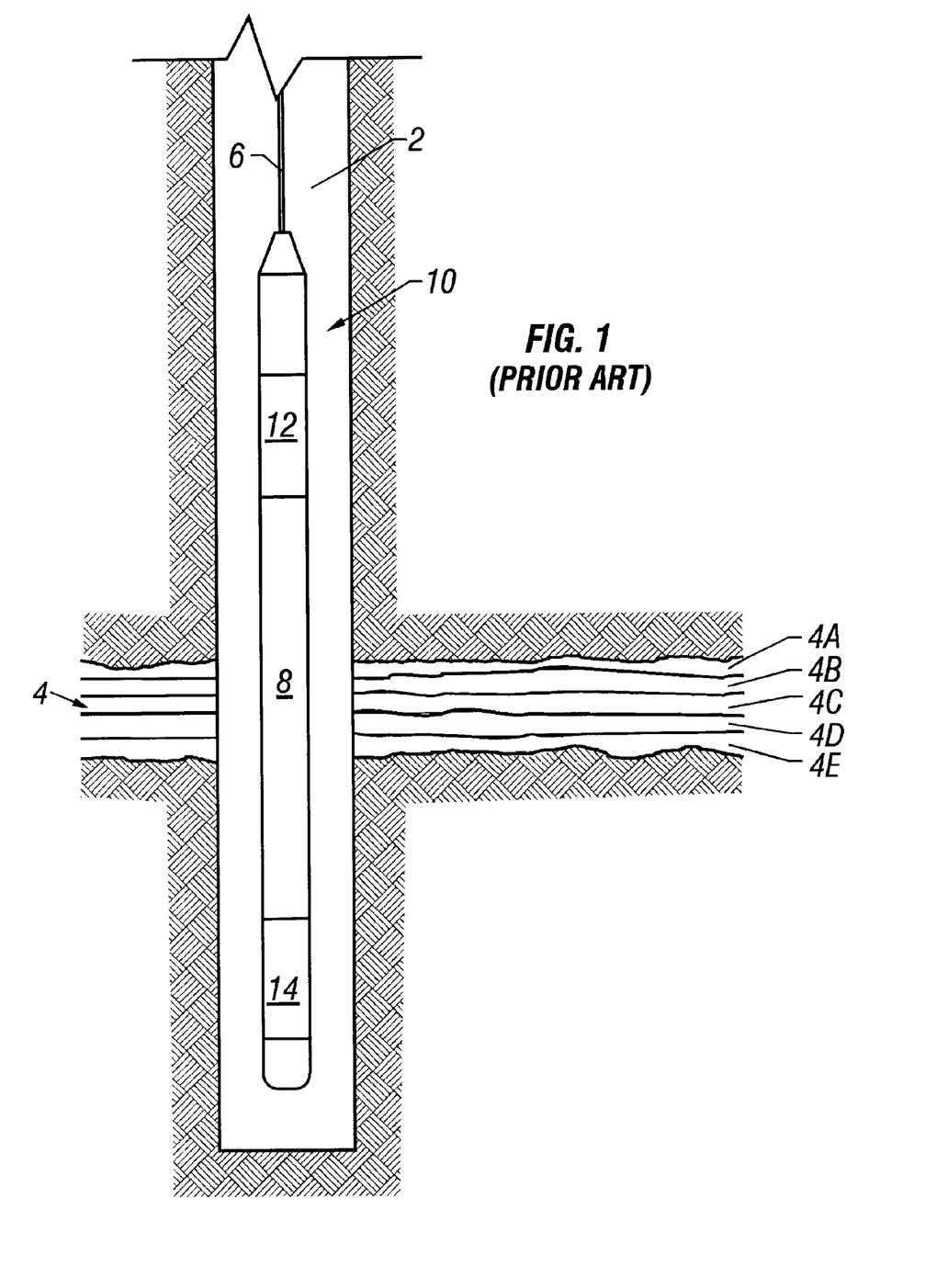
FIG. 1 (PRIOR ART) shows an induction instrument disposed in a wellbore penetrating earth formations.

FIG. 1 (PRIOR ART) shows an electromagnetic induction well logging instrument 10 disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14, as will be further explained, can include a signal generator and power amplifiers to cause alternating currents of selected frequencies to flow through transmitter coils in the coil mandrel unit 8.

The receiver/signal processing/telemetry electronics unit 12 can include receiver circuits for detecting voltages induced in receiver coils in the coil mandrel unit b, and circuits for processing these received voltages into signals representative of the conductivities of various layers, shown as 4A through 4F of the earth formations 4. As a matter of convenience for the system designer, the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2. Details of the operation of the tool may be found in the Gupta patent. It should be noted that the present invention may be used in conjunction with any suitable resistivity logging tool and that the device disclosed in the Gupta patent is for exemplary purposes only. Examples of propagation resistivity tools for determination of formation resistivity are described in U.S. Pat. No. 6,092,024 to Wu, U.S. Pat. No. 5,892,361 to Meyer et al. and U.S. Pat. No. 5,811,973 to Meyer, which documents are incorporated herein by reference.

Figure 2:
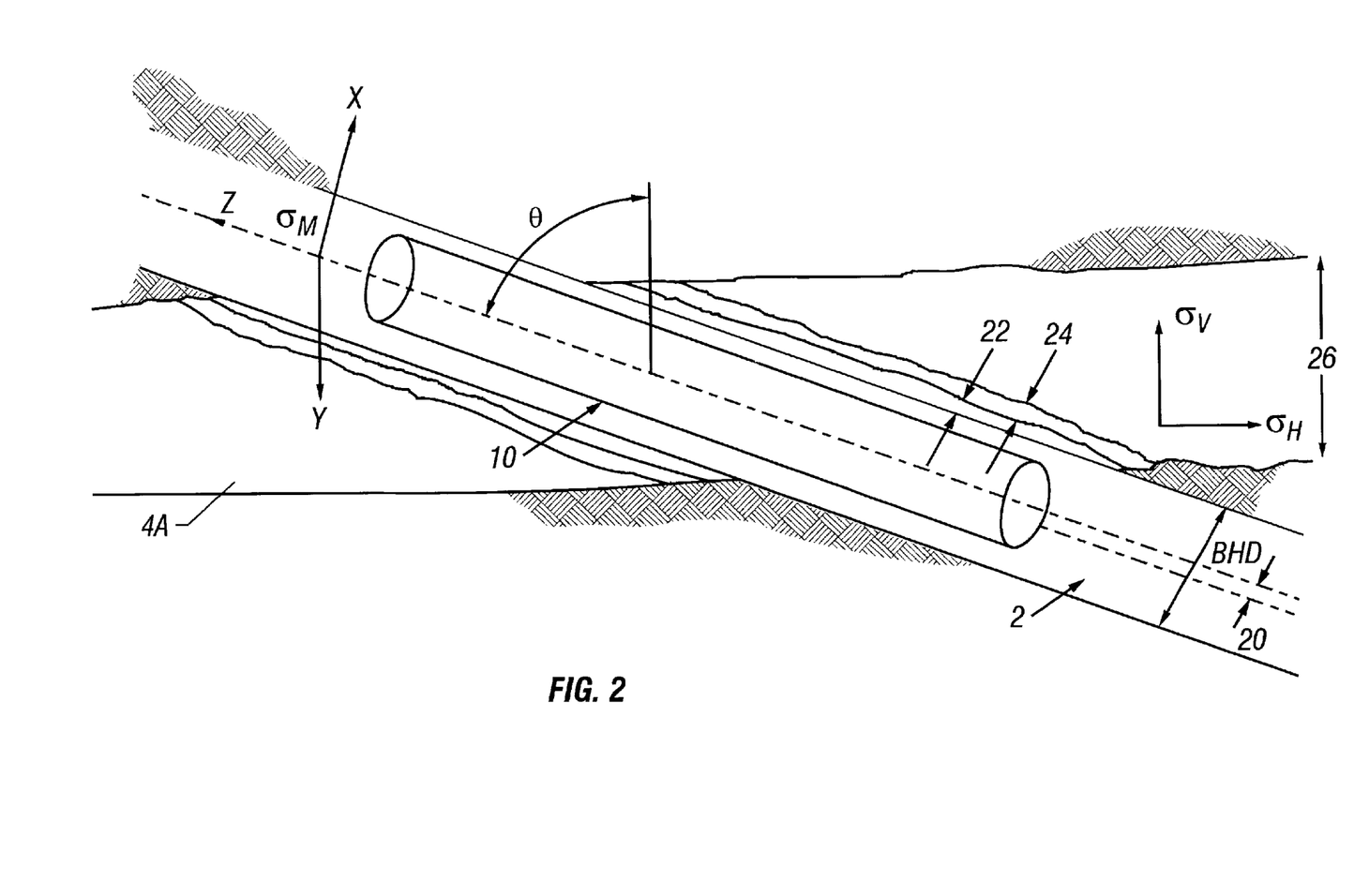
FIG. 2 shows a logging instrument disposed in an inclined wellbore wherein the formation has been invaded by borehole fluid.

Turning now to FIG. 2, the tool 10 is shown disposed in an inclined wellbore 2 wherein the borehole axis is tilted at a dip angle θ to the normal to the bed 4A. For the purposes of the present invention, the formation 4A is characterized by horizontal and vertical conductivities $\sigma_h$ and $\sigma_v$, or equivalently, by a vertical resistivity $R_t$ and an anisotropy factor λ. The special case of λ=1 corresponds to an isotropic formation and is also intended to be within the scope of the present invention. The formation 4A has a thickness "Thick" indicated by 22. The borehole diameter BHD is indicated in FIG. 2 as is a tool standoff 20. The standoff is the distance between the tool axis and the borehole axis and may be referred to in this application as STAN.

The borehole 2 is filled with a mud having a resistivity Rm, or equivalently, conductivity $\sigma_h$. Commonly, the borehole mud invades the formation, particularly permeable formations. This invasion is commonly modeled by two zones, an invasion zone (shown in FIG. 2 as having a length 22), and a transition zone (shown in FIG. 2 as having a length 24). The invaded zone and the transition zone are, in one embodiment of the invention, characterized by resistivities $R_{x0}$ and $R_{an}$. In an alternate embodiment of the invention, the resistivities of the invaded zone and the transition zone may also anisotropic.

Figure 5A:
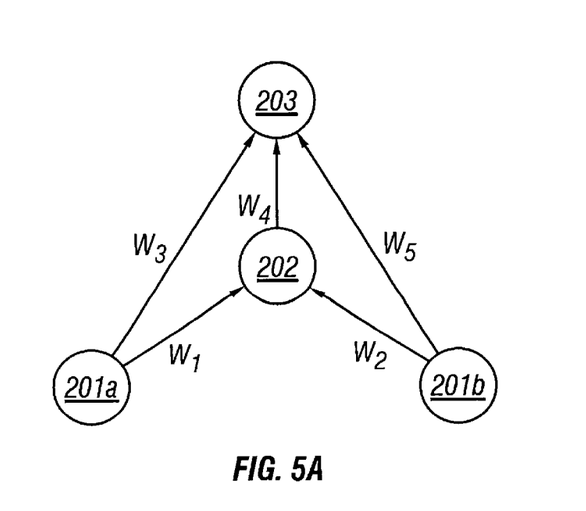
FIG. 5a (PRIOR ART) shows an example of a small NN with three layers of units.

The present invention may be broadly considered to comprise two stages. In the first stage, a NN is trained to produce borehole corrected data based upon a sampling of the possible borehole and formation parameters that may be expected in field operations. This may be done offline and the parameters of the NN stored in a processor included in the downhole tool at a suitable location, such as in the receiver/signal processing/telemetry electronics unit 12. The structure and the training of the NN are discussed below in reference to FIG. 5. The second stage of the invention is to use the trained NN and process measurements downhole, preferably in real time, to give borehole corrected resistivity data that may then be processed further, e.g., in inverting the data.

Figure 3:
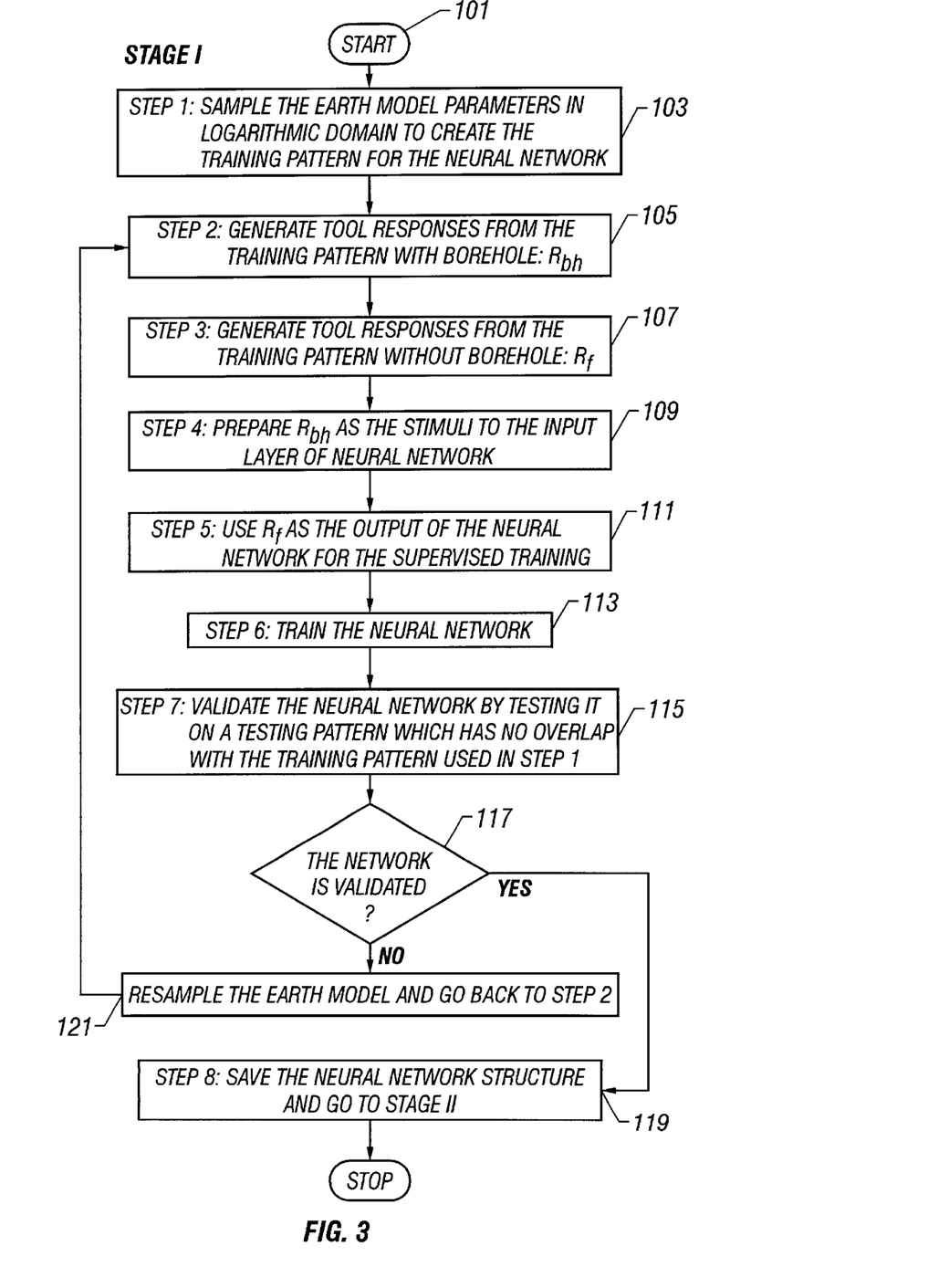
FIG. 3 illustrates some of the steps of training of a Neural Net in the present invention.

Turning now to FIG. 3, steps that comprise the first stage of the invention are shown. The first stage starts at 101 and the first step is to sample the earth model parameters to create a training pattern for the NN. In a preferred embodiment of the invention, the parameters comprise the following:

1. $R_t$, the formation resistivity. This is the reciprocal of vertical conductivity $\sigma_v$ in FIG. 2. In a preferred embodiment of the invention, $R_t$ is sampled from 0.01 Ohm-m. to 10,000 ohm meters with a sampling of 3 to 4 samples per decade.
2. $R_{x0}$, the invasion zone resisitivity. This is the resistivity of the zone 22 in FIG. 2. In a preferred embodiment of the invention, this is an isotropic property, although in an alternate embodiment of the invention, this too may be anisotropic, so that the invasion zone is characterized by two resistivities. $R_{x0}$ is sampled from 0.01 Ohm-m. to 10,000 ohm meters with a sampling of 3 to 4 samples per decade.
3. $R_{an}$, the transition zone resisitivity. This is the resistivity of the zone 24 in FIG. 2. In a preferred embodiment of the invention, this is an isotropic property, although in an alternate embodiment of the invention, this too may be anisotropic, so that the invasion zone is characterized by two resistivities. $R_{an}$ is sampled from 0.01 Ohm-m. to 10,000 ohm meters with a sampling of 3 to 4 samples per decade.
4. $R_m$, the mud resisitivity. This is the reciprocal of the mud conductivity $\sigma_m$ FIG. 2. In a preferred embodiment of the invention, $R_m$ is sampled from 0.01 Ohm-m. to 1,000 ohm meters with a sampling of 3 to 4 samples per decade.
5. $L_{x0}$, the invasion zone length. This is the length of the zone 22 in FIG. 2. In a preferred embodiment, $L_{x0}$ is linearly sampled every 5 inches from 0 to 100 inches.
6. $L_{an}$, the transition zone length. This is the length of the zone 24 in FIG. 2. In a preferred embodiment, $L_{x0}$ is linearly sampled every 5 inches from 0 to 100 inches.
7. BHD, the borehole diameter indicated by BHD in FIG. 2. This is the diameter of the borehole 2. In a preferred embodiment, BHD is sampled from 6, 8, 10, 12, 16 and 20 inches.
8. Dip: The dip angle θ is indicated in FIG. 2 and in a preferred embodiment, is linearly sampled between 50°, 10°, 15°, 20°, 25°, 30°, 40°, 50°, 60°, 70°, 75°, 80°, 85°and 90°, i.e., less closely sampled near 45° dip
9. The anisotropy ratio λ, defined as the ratio of the horizontal to the vertical conductivity of the formation. In a preferred embodiment, this is sampled at 1, 1.2, 1.4, 1.6, 1.8, 2., 2.2, 2.4, 2.8, 3., 3.5, 5. and 10.
10. Stan: the stand-off, or separation 20 between the tool axis and the borehole axis. In a preferred embodiment, this is sampled at 0, 1, 2, 3, 4, 5, 6, 8 and 10 inches.
11. Thick is the thickness of the layer, indicated as 26 in FIG. 2. In a preferred embodiment, layer thickness are sampled at 0.5, 1, 2, 3, 5, 10, 12, 15, 17, 20, 25, 30, 35, 40, 45, 50 and 100 ft.

Those versed in the art would recognize that sampling all possible combinations of the above list would be impractical. For example, for vertical 1-D inversion, only 4 parameters are necessary: $R_t$, $R_m$, BHD and Thick. For such a case, the maximum number of patterns in the 4-D space defined by these parameters is 24×20×6×17=48960. The list provided here is a recommended starting point. Some modification may be necessary of the NN cannot be validated as discussed below.

Next, the tool responses $R_{bh}$ for a wide range of formation parameters and borehole parameters are determined 105 using any suitable forward modeling program. Those versed in the art would be familiar with such forward modeling programs. In a preferred embodiment of the invention, the tool responses should include what are known in the art as shallow and deep data. The shallow data correspond to tool configurations and/or frequencies that are primarily responsive to near borehole conditions and deep data correspond to tool configurations and/or frequencies that are primarily response to conditions away from the borehole. Typically, the shallow data are obtained with short transmitter-receiver spacings and higher frequencies while deep data are obtained with long transmitter-receiver spacings and lower frequencies. The formation and borehole parameters used in generating this tool response are referred to as the training set.

Next, the tool responses $R_f$ for the training set without taking the borehole and near borehole parameters into account 107, i.e., for setting the invaded zone and transition zone lengths to be equal to zero. These values of $R_f$ are the desired (i.e., borehole corrected) outputs corresponding to the measured values of $R_{bh}$ at 105. Accordingly, in steps 109, and 111, the values of $R_{bh}$ and $R_f$ are prepared as stimuli to the input layer of the NN and the desired output of the NN respectively. At 113 the NN is trained using the values of $R_{bh}$ and other readily measurable parameters as input to the NN and the values of $R_f$ as the desired output of the NN. The readily measurable parameters are the mud resistivity, the BHD and the standoff. The training of the NN is discussed below with reference to FIG. 5. Once the training of the NN has been complete, i.e., after all the samples in the training set have been used to train the NN, the NN is validated at 115.

When measurements are made with an array logging induction tool such as a HDIL, the tool responses with and without borehole effects comprise a plurality of voltages measured and a plurality of voltage differences. In a preferred embodiment of the invention, different NN is determined for every single measurement in the plurality of measurements. For example, if the number of voltages and voltage differences is 32, then 32 Neural Nets will be determined wherein the input to each of the NNs are the 32 measurements including borehole effects and the output of each NN is one of the 32 measurements without borehole effects. For a transverse induction logging tool as discussed in the Gupta patent, the measurements would similarly comprise voltages and voltage differences. Those versed in the art would recognize that when the present invention is used with propagation resistivity tools, then the measurements would comprise a plurality of amplitude and phase differences (or, equivalently, the real and imaginary part of the attenuations) for a plurality of transmitter-receiver combinations. The training of a different NN for each of the output measurements is purely a matter of convenience. In an alternate embodiment of the invention, a more complex NN is trained using a plurality of inputs and a plurality of outputs. In principle, training, validation and use of such a NN follows the same process as for a single NN, the only difference being the complexity of the NN. Hereafter, the discussion of the invention will be limited to a single NN, though it is to be understood that a plurality of NNs may be involved.

The validation process comprises:
1. Defining a test pattern that has no overlap with the training pattern used at 105 to give tool responses for the test pattern.
2. Determining the tool response without the borehole for the test pattern.
3. Determining the output of the NN when the tool responses from step (1) are used as input, and
4. Comparing the output of the NN at step (3) with the tool response for the test pattern at step (2).

If the agreement at step (4) of the validation process is good, the NN structure and parameters are saved and may be used in stage II. If the agreement at 117 is not good, then the earth model is resampled with a different set of values 121 and the process goes back to 103. The steps from 103 to 117 are repeated until a valid NN is obtained.

Once the NN has been validated, its structure and parameters may be stored in a processor located in the electronics unit 12 or other suitable location in the downhole tool 10. The NN may then be used to process, preferably in real time, measurements made by the logging device. Alternatively, the NN may be located at an uphole processor (not shown) and measurements telemetered uphole from the logging sonde processed thereat to give borehole corrected measurements. This is described with reference to FIG. 4.

Figure 4:
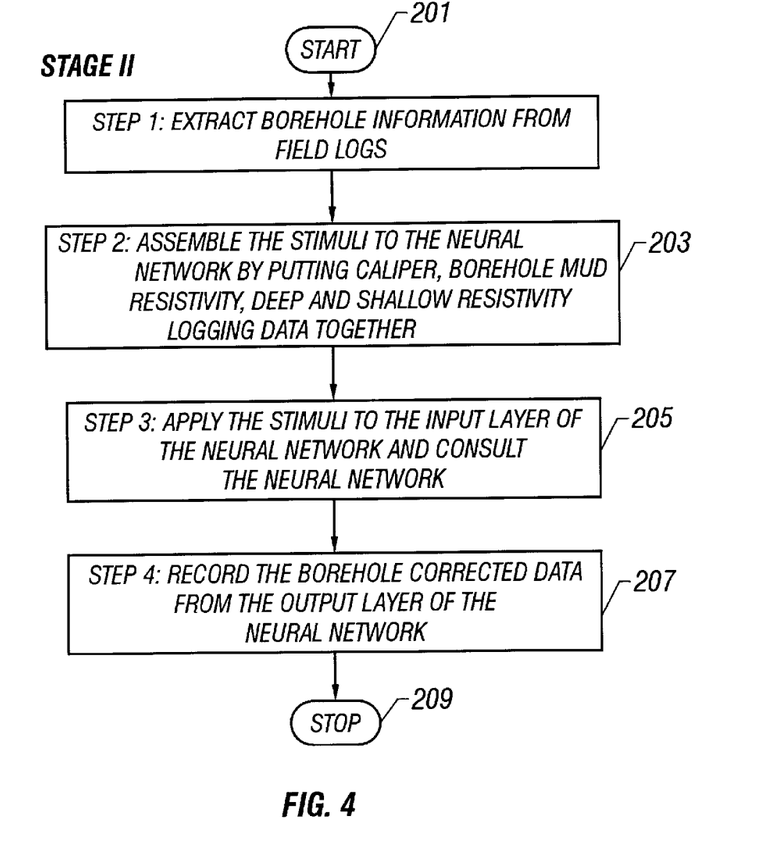
FIG. 4 is a flow chart illustrating the use of a trained Neural Net for obtaining borehole corrected resistivity measurements.

Turning now to FIG. 4, steps that comprise the application of the trained NN to processing of resistivity data are illustrated. Field resistivity logs are gathered 203 using known methods. These should preferably include both shallow and deep resistivity measurements as described above. As noted above in the discussion of the training of the NN, the input to the NN, in addition to the tool responses includes the mud resistivity, the borehole diameter and the standoff. The mud resistivity measurement is obtained using conventional devices and the borehole diameter and the standoff are obtained from caliper measurements. The formation and mud resistivity measurements and the caliper measurements are gathered 203 and input 205 to the validated NN obtained as described above. The output of the NN is, for each depth, a borehole corrected measurement. As noted above, a plurality of Neural Nets will, for an induction logging tool, give a plurality of voltages and voltage differences.

In a preferred embodiment of the invention, the Stuttgart Neural Net Simulator is used for the training of the NN. The basic principles and the terminology of Neural Nets is briefly discussed here.

A network consists of units and directed, weighted links (connections) between them. In analogy to activation passing in biological neurons, each unit receives a net input that is computed from the weighted outputs of prior units with connections leading to this unit. FIG. 5a shows an example of a small network a NN with three layers of units that consists of two input units 201a, 201b, a hidden unit 202 and an output unit 203. For each unit, a net input of the unit from the weighted output values of prior units is determined. The activation function for each unit computes the new activation from this net input (and possibly its previous activation). The output function takes this result to generate the output of the unit. The training of the NN comprises modifying the weights w1, w2, w3, ... for the network so that the input to the network produces the desired output.

This modification is very often based on the Hebbian rule, which states that a link between two units is strengthened if both units are active at the same time. The Hebbian rule in its general form is:

$$\Delta w_{ij} = g(a_j(t), t_j) h(o_i(t), w_{ij})$$

where:

$w_{ij}$ weight of the link from unit i to unit j $a_j(t)$ activation of unit j in step t $t_j$ teaching input, in general the desired output of unit j $o_i(t)$ output of unit i at time t g( ... ) function, depending on the activation of the unit and the teaching unit j h( ... ) function depending on the output of the preceding element and the current weight of the link Training a feed-forward neural network with supervised learning consists of the following procedure:
1. An input pattern is presented to the network. The input is then propagated forward in the net until activation reaches the output layer. This constitutes the so called forward propagation phase.
2. The output of the output layer is then compared with the teaching input. The error, i.e. the difference (delta between the output and the teaching input of a target output unit j is then used together with the output of the source unit i to compute the necessary changes of the link. To compute the deltas of inner units for which no teaching input is available, (units of hidden layers) the deltas of the following layer, which are already computed, are used. In this way the errors (deltas) are propagated backward, so this phase is called backward propagation.

In online learning, the weight changes are applied to the network after each training pattern, i.e. after each forward and backward pass. In offline learning or batch learning the weight changes are cumulated for all patterns in the training file and the sum of all changes is applied after one full cycle (epoch) through the training pattern file.

A preferred of the present invention uses backpropagation. In the backpropagation learning algorithm online training is usually significantly faster than batch training, especially in the case of large training sets with many similar training examples.

The backpropagation weight update rule, also called generalized delta-rule reads as follows:

$$\Delta w_{ij} = \eta \delta_{ij} o_i$$

$$\delta_{ij} = \begin{cases} f_j'(net_j)(t_j - o_j) & \text{if unit } j \text{ is an output unit} \\ f_j'(net_j) \sum_k \delta_k w_{jk} & \text{if unit } j \text{ is a hidden unit} \end{cases}$$

where:

η learning factor (a constant)

$\delta_{ij}$ error (difference between the real output and the teaching input) of unit j $t_j$ teaching input of unit j i index of predecessor to the current unit j with link $w_{ij}$ from i to j.

j index of the current unit k index of a successor to the current unit j with link $w_{jk}$ from j to k.

Other methods of training Neural Nets would be known to those versed in the art. Such other methods are intended to be within the scope of the present invention.

In an alternate embodiment of the invention, a second set of NNs is trained for the purpose of inversion of the borehole—corrected measurements. Such a NN is disclosed in U.S. Pat. No. 6,044,325 issued to Chakravarty et al. and having the same assignee as the present invention and the contents of which are fully incorporated herein by reference. This second NNs may also be in the downhole tool or may be located uphole. As disclosed in the '325 patent, the neural network model preferred for this inversion is known as radial basis function (RBF) because of the relatively high training speed and accuracy. An RBF network includes 3 "layers" of units or neurons, the input layer, the hidden (or RBF) layer and the output layer. When an input vector, x, is presented to the network, the network responds with an output vector, y. The network output is simply a linear sum of certain radially symmetric functions. x and y are usually related as:

$$R(x)=G(\|x-x_j\|/\sigma_j)$$

$$y=w*R$$

where G represents a radially symmetric function, usually a Gaussian function, $x_j$ represents the centroid of the j-th RBF and is the mean value of the Gaussian, $\sigma_j$ represents the Gaussian width and R is the vector of $R_j$ s. w represents a coefficient vector of weights for the Gaussian functions.

Those skilled in the art will devise other embodiments of this invention which do not depart from the spirit of the invention as disclosed herein. Accordingly, the invention should be limited in scope only by the attached claims.

What is claimed is:

1. A method of determining a plurality of parameters of interest of a subsurface formation in the proximity of a borehole, the method comprising:

(a) using a processor including a forward modeling algorithm of tool responses for deriving parameters of at least one neural net designed for making borehole corrections to resistivity measurements;

(b) conveying a logging tool into the borehole and obtaining therefrom tool responses indicative of the parameter of interest, said measurements including borehole effects; and (c) using the at least one neural net with the derived parameters for applying said borehole corrections to the tool responses in (b) for obtaining at least one corrected tool response.

2. The method of claim 1 wherein the logging tool is a resistivity logging tool.

3. The method of claim 2 wherein the parameter of interest is at least one of (i) a horizontal resistivity of the formation, (ii) a vertical resistivity of the formation, and, (iii) a dip of the formation.

4. The method of claim 2 wherein the forward modeling algorithm includes effects of earth model parameters including at least one of (i) a horizontal resistivity of the formation, (ii) a vertical resistivity of the formation, (iii) a resistivity of an invaded zone of the formation, (iv) a resistivity of a transition zone of the formation, (v) a resistivity of mud in the borehole, (vi) a length of an invaded zone of the formation, (vii) a length of a transition zone in the formation, (viii) a diameter of the borehole, (ix) a standoff of a measurement tool relative to an axis of the borehole, and, (x) a thickness of a layer in the formation.

5. The method of claim 4 wherein deriving the parameters of the at least one neural net further comprises training the at least one neural net and validating the at least one neural net.

6. The method of claim 5 wherein training the at least one neural net further comprises:

(i) using the modeling algorithm for obtaining a first plurality of tool response values inclusive of borehole parameters for a training pattern of earth model parameters;

(ii) using the modeling algorithm for obtaining a second plurality of tool response values exclusive of borehole parameters for said training pattern of earth model parameters;

(iii) using as input to the at least one neural net the first plurality of tool response values and at least one of said borehole parameters;

(iv) using the second plurality of tool response values as a desired output of the at least one neural net; and (v) adjusting parameters of the at least one neural net to reduce a difference between an actual output of the at least one neural net and the desired output of the at least one neural net to give the at least one trained neural net.

7. The method of claim 6 wherein validating the at least one neural net further comprises:

(A) using the modeling algorithm for obtaining a third plurality of tool response values inclusive of borehole parameters for a test pattern of earth model parameters wherein said test pattern is distinct from said training pattern;

(B) using the modeling algorithm for obtaining a fourth plurality of tool response values exclusive of borehole parameters for said test pattern of earth model parameters;

(C) using as input to the at least one neural net the third plurality of tool response values and the at least one borehole parameter;

(D) using the fourth plurality of tool response values as a desired output of the at least one neural net, and (E) determining a difference between an actual output of the at least one neural net and the desired output of the at least one neural net and validating the at least one neural net if said difference is less than a predetermined value.

8. The method of claim 6 wherein the at least one borehole parameter is selected from the group consisting of (i) a mud resistivity, (ii) a borehole diameter, and, (iii) a tool standoff.

9. The method of claim 6 wherein adjusting the parameters of the at least one neural net further comprises using the Hebbian rule and applying a backpropagation step.

10. The method of claim 2 wherein the resistivity logging tool is an induction logging tool including a plurality of transmitters and a plurality of receivers and the tool responses further comprise (i) a voltage measured by at least one of said plurality of receivers, and, (ii) a difference of voltages between at least one of said plurality of receivers.

11. The method of claim 10 wherein said plurality of transmitters further comprises at least two antennas having sensitive directions inclined to each other.

12. The method of claim 10 wherein said plurality of receivers further comprises at least two antennas having sensitive directions inclined to each other.

13. The method of claim 2 wherein said resistivity logging tool comprises a propagation logging tool having a plurality of transmitters and a plurality of receivers, and the tool responses further comprise relative attenuation and phase shift between pairs of said receivers.

14. The method of claim 10 wherein said induction logging tool is adapted to operate at a plurality of frequencies.

15. The method of claim 13 wherein said propagation logging tool is adapted to operate at a plurality of frequencies.

16. The method of claim 2 further comprising inverting said borehole corrected tool responses thereby obtaining said plurality of parameters of interest.

17. The method of claim 2 wherein said plurality of parameters of interest comprise borehole corrected resistivity measurements, the method further comprising:

using a processor including at least one additional neural net designed for inverting said borehole corrected resistivity measurements and obtaining therefrom an inverted model having at least one layer, said model further including at least one of (i) a thickness, (ii) horizontal conductivity, (iii) anisotropy parameter, (iv) dip angle, and, (v) azimuth for the at least one layer.

18. The method of claim 17 wherein said at least one additional neural network further comprises a radial basis function model.

19. The method of claim 17 further comprising training and validating the at least one additional neutral network.

20. The method of claim 1 wherein deriving the parameters of the at least one neural net further comprises training the at least one neural net and validating the at least one neural net.

21. The method of claim 20 wherein training the at least one neural net further comprises:

(i) using the modeling algorithm for obtaining a first plurality of tool response values inclusive of borehole parameters for a training pattern of earth model parameters;

(ii) using the modeling algorithm for obtaining a second plurality of tool response values exclusive of borehole parameters for said training pattern of earth model parameters;

(iii) using as input to the at least one neural net the first plurality of tool response values and at least one of said borehole parameters;

(iv) using the second plurality of tool response values as a desired output of the at least one neural net; and (v) adjusting parameters of the at least one neural net to reduce a difference between an actual output of the at least one neural net and the desired output of the at least one neural net to give the at least one trained neural net.

22. The method of claim 21 wherein validating the at least one neural net further comprises:

(A) using the modeling algorithm for obtaining a third plurality of tool response values inclusive of borehole parameters for a test pattern of earth model parameters wherein said test pattern is distinct from said training pattern;

(B) using the modeling algorithm for obtaining a fourth plurality of tool response values exclusive of borehole parameters for said test pattern of earth model parameters;

(C) using as input to the at least one neural net the third plurality of tool response values and the at least one borehole parameter;

(D) using the fourth plurality of tool response values as a desired output of the at least one neural net, and (E) determining a difference between an actual output of the at least one neural net and the desired output of the at least one neural net and validating the at least one neural net if said difference is less than a predetermined value.

23. The method of claim 21 wherein adjusting the parameters of the at least one neural net further comprises using the Hebbian rule and applying a backpropagation step.

* * * * *